US010322515B2

(12) United States Patent
Akaha (10) Patent No.: US 10,322,515 B2
(45) Date of Patent: Jun. 18, 2019

(54) ROBOT SYSTEM

(71) Applicant: Seiko Epson Corporation, Tokyo (JP)

(72) Inventor: Kazushige Akaha, Azumino (JP)

(73) Assignee: Seiko Epson Corporation (JP)

( * ) Notice: Subject to any disclaimer, the term of this patent is extended or adjusted under 35 U.S.C. 154(b) by 559 days.

(21) Appl. No.: 15/080,640

(22) Filed: Mar. 25, 2016

(65) Prior Publication Data

US 2016/0288342 A1  Oct. 6, 2016

(30) Foreign Application Priority Data

Mar. 31, 2015  (JP) ................................ 2015-071200

(51) Int. Cl.
*B25J 21/00* (2006.01)
*B25J 9/00* (2006.01)
*B25J 9/04* (2006.01)

(52) U.S. Cl.
CPC ............. *B25J 21/00* (2013.01); *B25J 9/0018* (2013.01); *B25J 9/0084* (2013.01); *B25J 9/046* (2013.01); *Y10S 901/49* (2013.01)

(58) Field of Classification Search
CPC ........ B25J 9/008; B25J 9/0018; B25J 9/0084; B25J 9/046; Y10S 901/49
USPC ........................................................ 901/49
See application file for complete search history.

(56) References Cited

U.S. PATENT DOCUMENTS

| | | | | |
|---|---|---|---|---|
| 4,894,855 | A | * | 1/1990 | Kresse ................... A61B 6/032 378/189 |
| 9,037,293 | B2 | | 5/2015 | Gomi et al. |
| 2003/0221504 | A1 | * | 12/2003 | Stoianovici ................ B25J 9/06 74/490.04 |
| 2008/0086237 | A1 | * | 4/2008 | Rebstock ........... G05B 19/4189 700/248 |
| 2013/0055560 | A1 | | 3/2013 | Nakasugi et al. |
| 2014/0277713 | A1 | | 9/2014 | Kouno et al. |

FOREIGN PATENT DOCUMENTS

| | | |
|---|---|---|
| JP | 59-232779 A | 12/1984 |
| JP | S61-152380 A | 7/1986 |
| JP | 09-141592 A | 6/1997 |
| JP | 2011-240443 A | 12/2011 |
| JP | 2013-099801 A | 5/2013 |
| JP | 2014-046401 A | 3/2014 |
| WO | WO-2003-051575 A1 | 6/2003 |

OTHER PUBLICATIONS https://www.bmigaming.com/games-arcade-crane-claw-machines.htm (Year: 2015).*
BMI Gaming Webpage, www.bmigaming.com, Sep. 2, 2013 (4 pages).

* cited by examiner

*Primary Examiner* — Ronald P Jarrett
(74) *Attorney, Agent, or Firm* — Harness, Dickey & Pierce, P.L.C.

(57) ABSTRACT

A robot system includes a cell; and a first robot and a second robot which are provided in the cell, in which the first robot includes an n-th (n is an integer which is equal to or greater than 1) arm which rotates around an n-th rotating axis, and an (n+1)th arm which is provided to rotate around an (n+1)th rotating axis which is an axial direction different from an axial direction of the n-th rotating axis, in the n-th arm, in which the length of the n-th arm is longer than the length of the (n+1)th arm, and in which, when viewed from the (n+1)th rotating axis, the n-th arm and the (n+1)th arm overlap each other.

11 Claims, 10 Drawing Sheets

ROBOT SYSTEM

BACKGROUND

1. Technical Field

The present invention relates to a robot system.

2. Related Art

In the related art, a robot provided with a robot arm is known. In the case of the robot arm, a plurality of arms (arm members) are linked to each other via a joint portion, and for example, a hand is mounted on the arm furthest on the tip end side (the most downstream side) as an end effector. The joint portion is driven by a motor, and the arm rotates by the driving of the joint portion. In addition, the robot grabs an object by the hand, moves the object to a predetermined position, and performs predetermined work, such as assembly.

As such a robot, in JP-A-2014-46401, a vertical articulated robot is disclosed. The robot described in JP-A-2014-46401 is configured to perform an operation of moving a hand with respect to a base to a position different by 180° around a first rotating axis that is a rotating axis (rotating axis that extends in a vertical direction) furthest on the base end side (most upstream side), by rotating a first arm which is the arm furthest on the base end side with respect to the base around the first rotating axis.

In the robot described in JP-A-2014-46401, when moving the hand with respect to the base to a position different by 180° around the first rotating axis, a large space for preventing interference of the robot is necessary.

SUMMARY

An advantage of some aspects of the invention is to provide a robot system in which an operation of moving a position of a tip end portion of a first robot to a position different by 180° around a first rotating axis can be realized, even when a space for preventing interference of the first robot is small.

The invention can be implemented as the following forms or application examples.

Application Example 1

A robot system according to an aspect of the invention includes: a cell; and a first robot and a second robot which are provided in the cell, in which the first robot includes an n-th (n is an integer which is equal to or greater than 1) arm which rotates around an n-th rotating axis, and an (n+1)th arm which is provided to rotate around an (n+1)th rotating axis which is an axial direction different from an axial direction of the n-th rotating axis, in the n-th arm, in which the length of the n-th arm is longer than the length of the (n+1)th arm, and in which, when viewed from the (n+1)th rotating axis, the n-th arm and the (n+1)th arm overlap each other.

With this configuration, it is possible to reduce the space for preventing interference of the first robot when the tip end of the (n+1)th arm is moved to a position different by 180° around the n-th rotating axis. Accordingly, it is possible to reduce the size of the cell, and to reduce the size of an installation space for installing the robot system. In addition, since the first robot and the second robot are provided in one cell, it is possible to perform more work in one cell.

Application Example 2

In the robot system according to the application example of the invention, it is preferable that the first robot includes a first base provided in the cell, and the n-th arm is provided on the first base.

With this configuration, it is possible to rotate the n-th arm and the (n+1)th arm with respect to the first base.

Application Example 3

In the robot system according to the application example of the invention, it is preferable that the second robot includes a second base, an m-th (m is an integer which is equal to or greater than 1) arm which is provided on the second base and rotates around an m-th rotating axis, and an (m+1)th arm which is provided to rotate around an (m+1)th rotating axis which is an axial direction parallel to an axial direction of the m-th rotating axis in the m-th arm.

With this configuration, it is possible to provide the small second robot provided with the m-th arm and the (m+1)th arm which rotate around the m-th rotating axis, and to further reduce a region where the second robot is disposed.

Application Example 4

In the robot system according to the application example of the invention, it is preferable that the second robot includes an m-th (m is an integer which is equal to or greater than 1) arm which rotates around an m-th rotating axis, and an (m+1)th arm which is provided to rotate around an (m+1)th rotating axis which is an axial direction different from an axial direction of the m-th rotating axis in the m-th arm.

With this configuration, since the m-th arm and the (m+1)th arm which have different axial directions from each other are provided, it is possible to further enhance the degree of freedom of work by the second robot.

Application Example 5

In the robot system according to the application example of the invention, it is preferable that the length of the m-th arm is longer than the length of the (m+1)th arm, and when viewed from the axial direction of the (m+1)th rotating axis, the m-th arm and the (m+1)th arm overlap each other.

With this configuration, it is possible to further reduce the space for preventing interference of the second robot when the tip end of the (m+1)th arm is moved to a position different by 180° around the m-th rotating axis.

Application Example 6

In the robot system according to the application example of the invention, it is preferable that the second robot includes a second base provided in the cell, and the m-th arm is provided on the second base.

With this configuration, it is possible to rotate the m-th arm and the (m+1)th arm with respect to the second base.

Application Example 7

In the robot system according to the application example of the invention, it is preferable that the cell includes a first surface, and a second surface which opposes the first surface, the first robot is provided on the first surface, and the second robot is provided on the second surface.

With this configuration, it is possible to dispose the first robot and the second robot to oppose each other. For this reason, it is possible to further reduce the size of the cell, and thus, to further reduce the installation space for installing the robot system.

Application Example 8

In the robot system according to the application example of the invention, it is preferable that at least a part of the first surface overlaps at least a part of the second surface when viewed from the vertical direction.

With this configuration, it is possible to dispose the first robot and the second robot to oppose each other. For this reason, it is possible to further reduce the width of the cell, and to further reduce the installation space for installing the robot system.

Application Example 9

In the robot system according to the application example of the invention, it is preferable that the first robot includes a first base provided in the cell, the n-th arm is provided on the first base, the second robot includes a second base provided in the cell, and an m-th arm provided on the second base, and at least a part of the first base overlaps at least a part of the second base when viewed from the vertical direction.

With this configuration, it is possible to dispose the first robot and the second robot to oppose each other. For this reason, it is possible to further reduce the width of the cell, and to further reduce the installation space for installing the robot system.

Application Example 10

In the robot system according to the application example of the invention, it is preferable that an installation area of the cell is less than 637,500 mm$^2$.

Since it is possible to reduce the space for preventing interference of the first robot when the tip end of the (n+1)th arm is moved to a position different by 180° around the n-th rotating axis, even in the cell having such an installation area, it is possible to prevent interference of the first robot during movement.

Application Example 11

In the robot system according to the application example of the invention, it is preferable that an installation area of the cell is less than 500,000 mm$^2$.

Since it is possible to reduce the space for preventing interference of the first robot when the tip end of the (n+1)th arm is moved to a position different by 180° around the n-th rotating axis, even in the cell having such an installation area, it is possible to prevent interference of the first robot during movement.

BRIEF DESCRIPTION OF THE DRAWINGS

The invention will be described with reference to the accompanying drawings, wherein like numbers reference like elements.

FIGS. 6A to 6E are views illustrating an operation of the first robot (second robot) illustrated in FIG. 1.

FIGS. 7A to 7C are views illustrating an operation when the first robot and the second robot illustrated in FIG. 1 perform work.

DESCRIPTION OF EXEMPLARY EMBODIMENTS

Hereinafter, a robot system according to the invention will be described in detail based on an appropriate embodiments illustrated in the attached drawings.

First Embodiment

Figure 1:
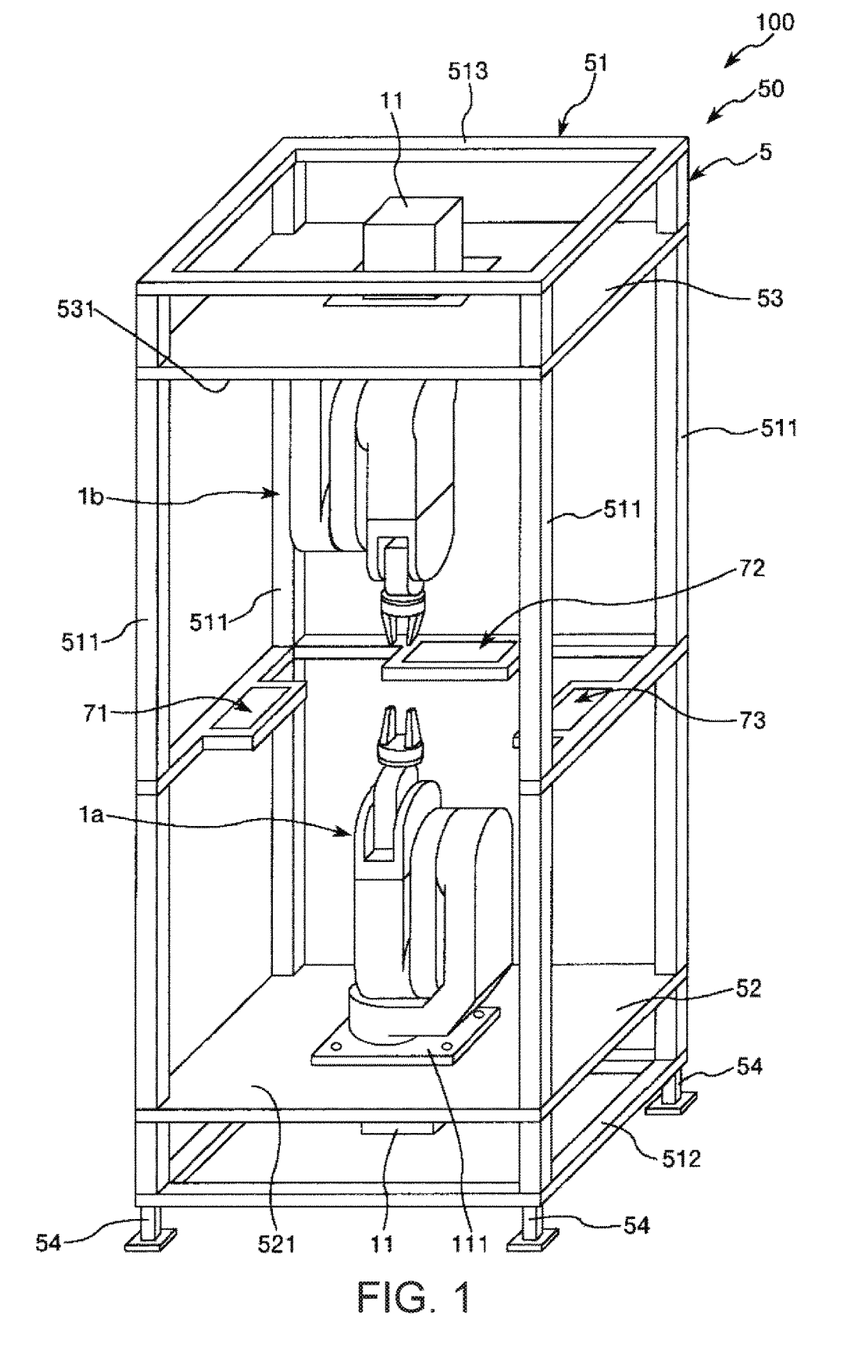
FIG. 1 is a perspective view illustrating a first embodiment of a robot system according to the invention.
Figure 2:
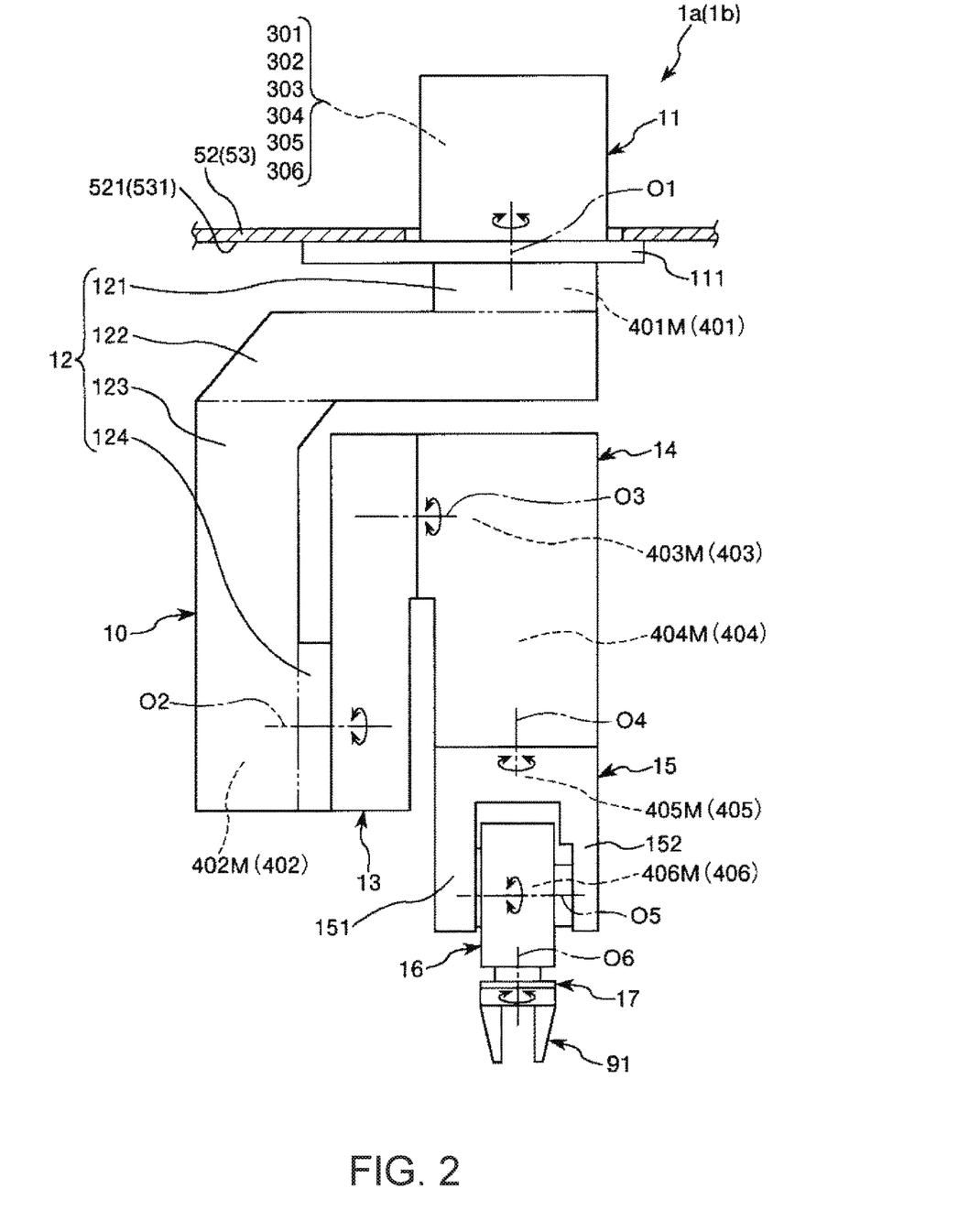
FIG. 2 is a front view of a first robot (second robot) illustrated in FIG. 1.
Figure 3:
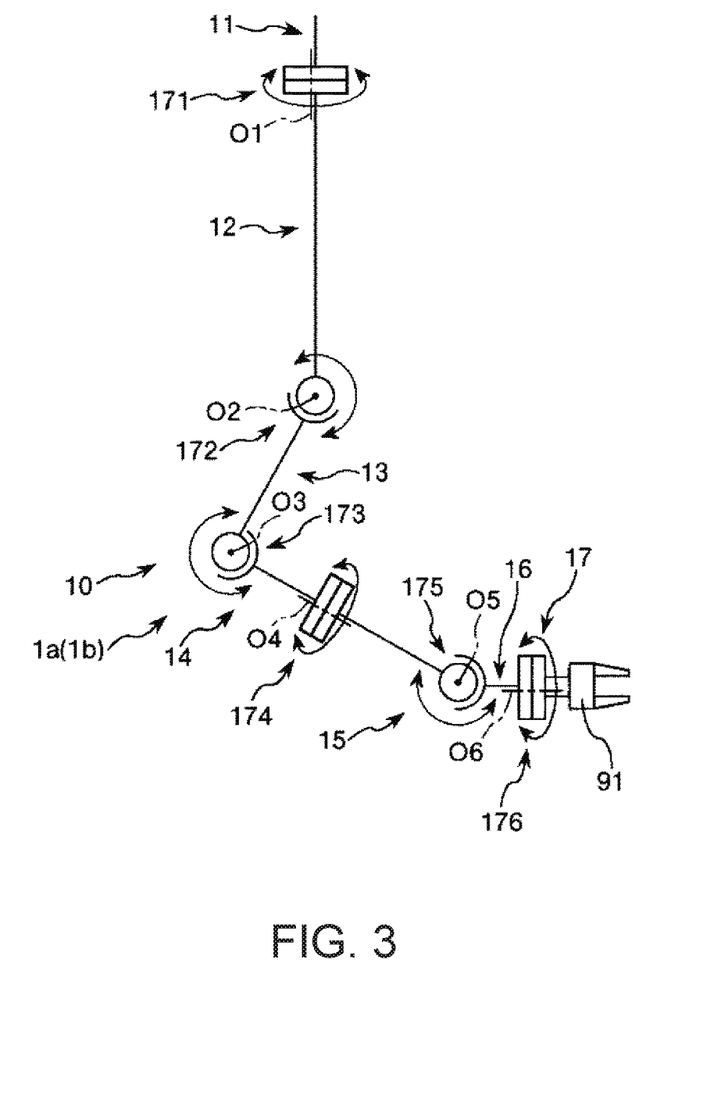
FIG. 3 is a schematic view of the first robot (second robot) illustrated in FIG. 1.
Figure 4:
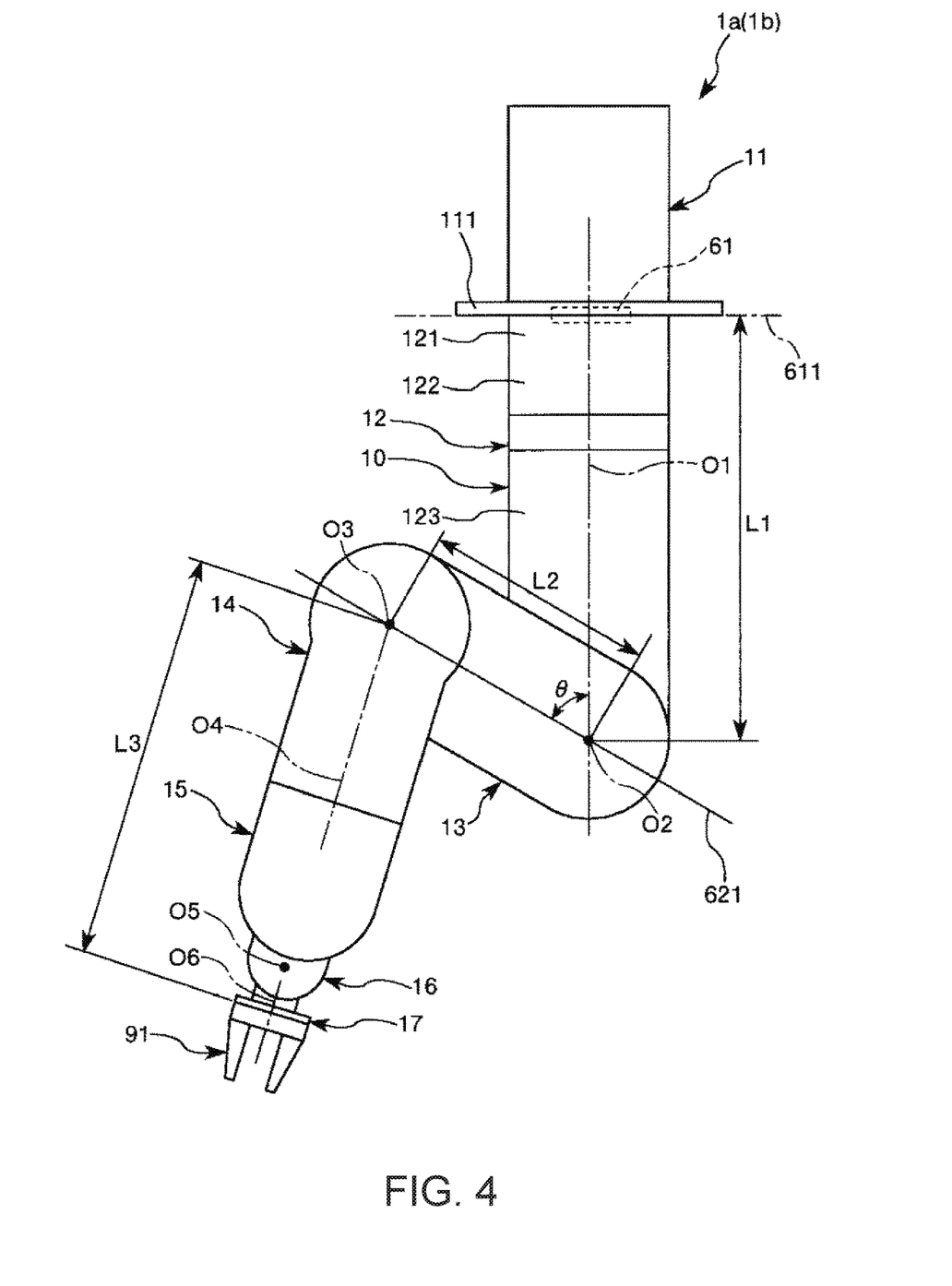
FIG. 4 is a side view of the first robot (second robot) illustrated in FIG. 1.
Figure 5:
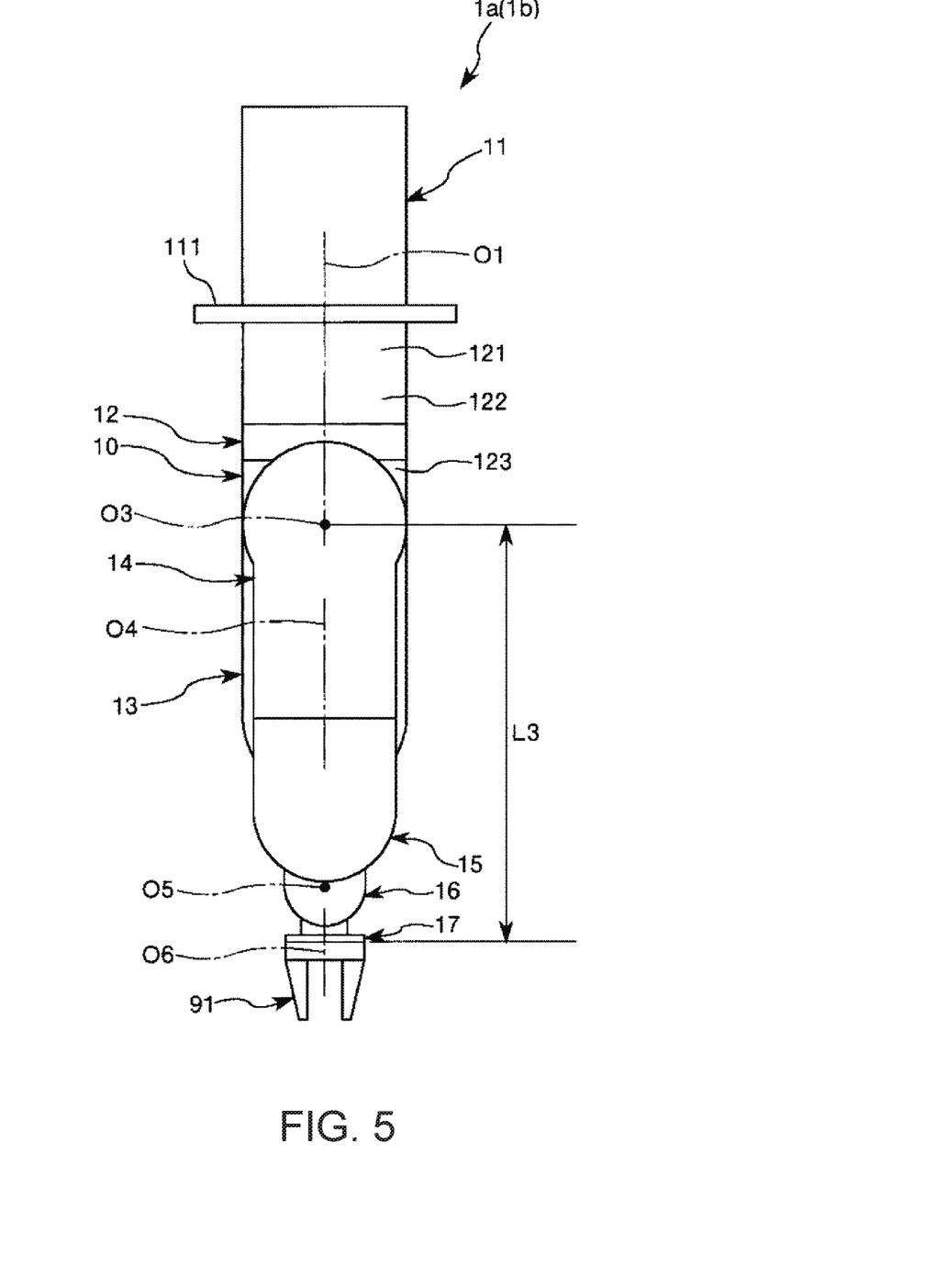
FIG. 5 is a side view of the first robot (second robot) illustrated in FIG. 1.
Figure 7A:
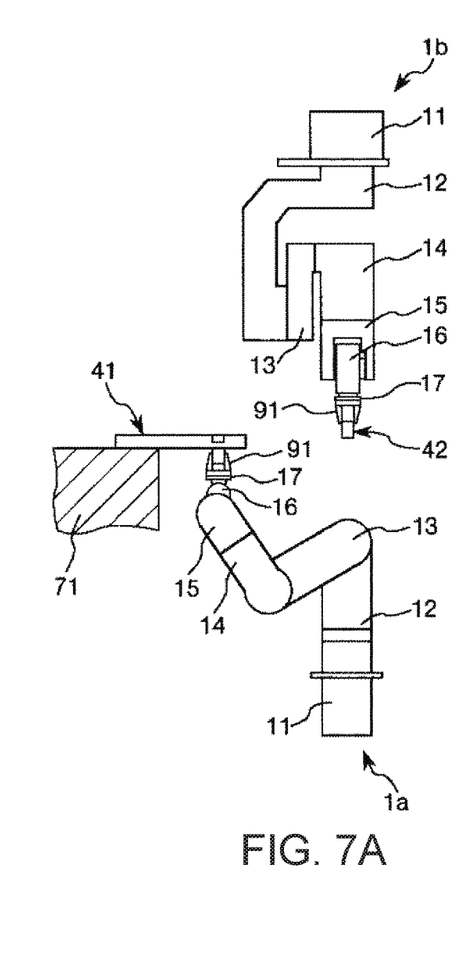
Figure 7B:
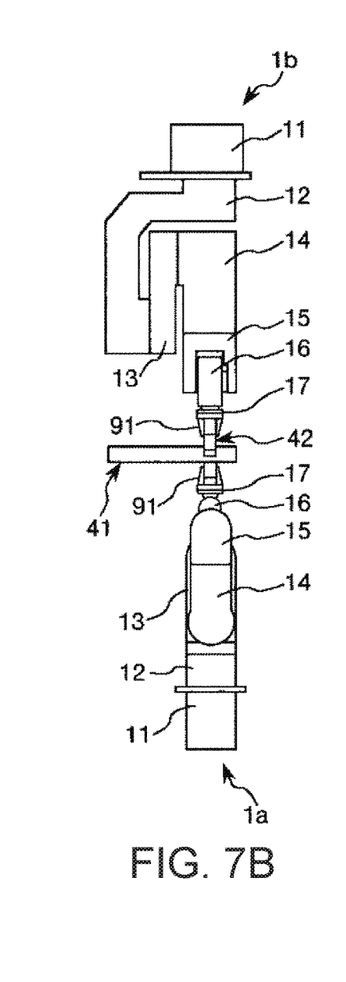
Figure 7C:
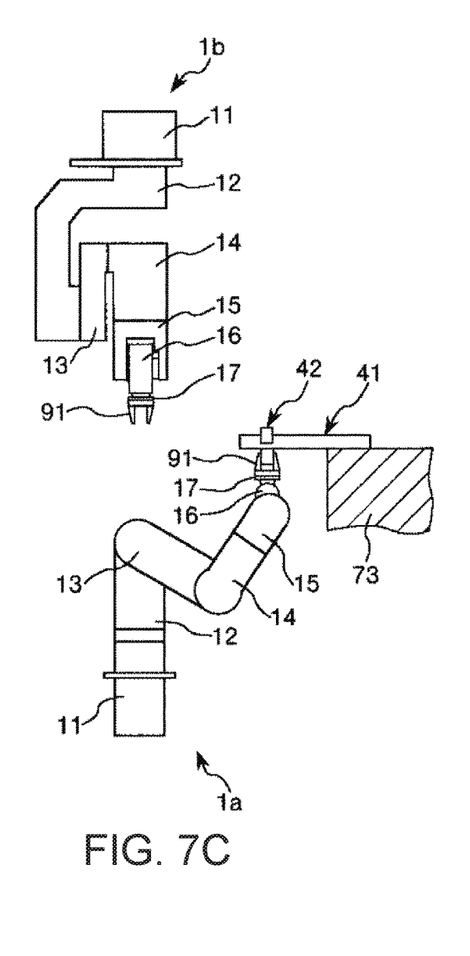
Figure 8:
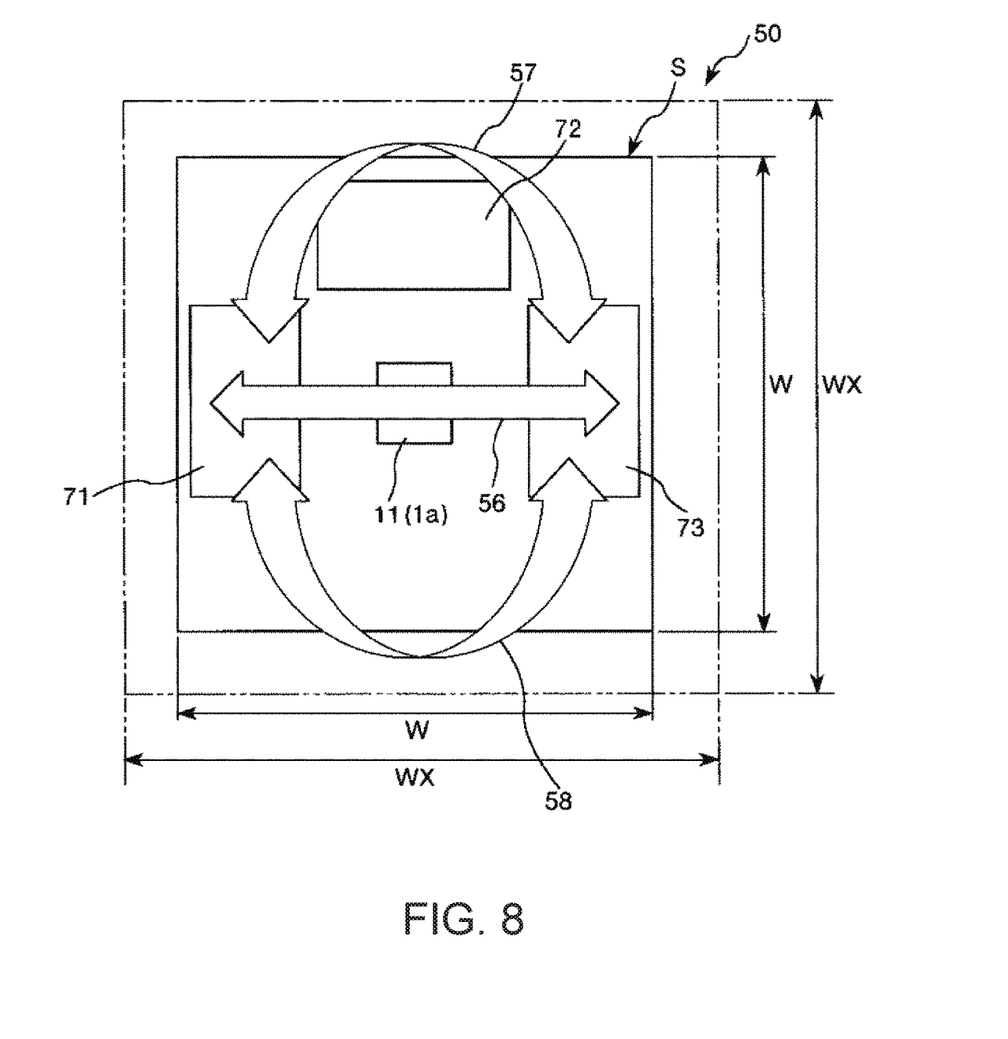
FIG. 8 is a view illustrating a moving path of a tip end portion of a robot arm included in the first robot illustrated in FIG. 1.
Figure 9:
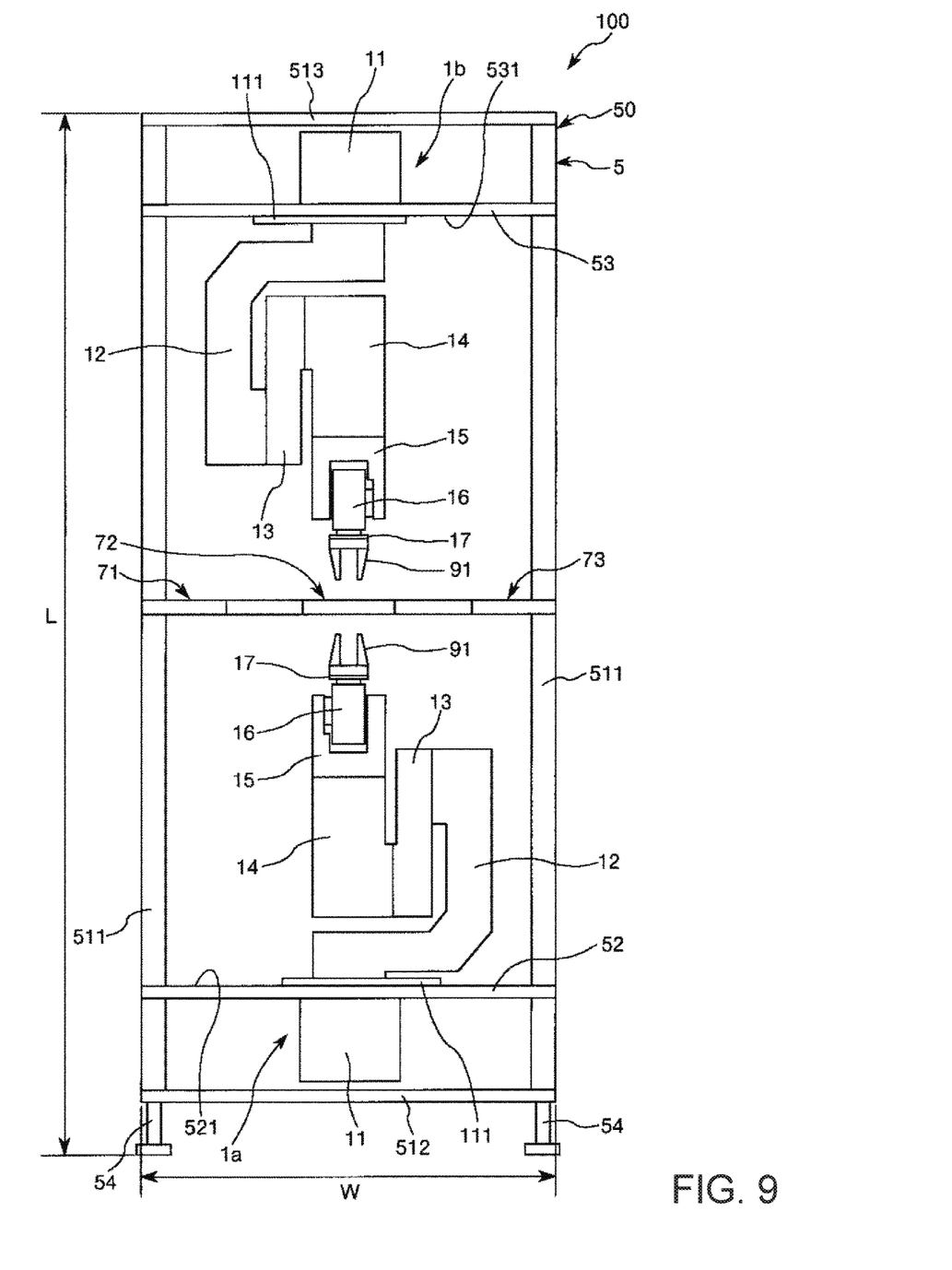
FIG. 9 is a front view of the robot system illustrated in FIG. 1.

FIG. 1 is a perspective view illustrating a first embodiment of the robot system according to the invention. FIG. 2 is a front view of a first robot (second robot) illustrated in FIG. 1. FIG. 3 is a schematic view of the first robot (second robot) illustrated in FIG. 1. FIGS. 4 and 5 are respectively side views of the first robot (second robot) illustrated in FIG. 1. FIGS. 6A to 6E are views illustrating an operation of the first robot (second robot) illustrated in FIG. 1. FIGS. 7A to 7C are views illustrating an operation when the first robot and the second robot illustrated in FIG. 1 perform work. FIG. 8 is a view illustrating a moving path of a tip end portion of a robot arm included in the first robot illustrated in FIG. 1. FIG. 9 is a front view of the robot system illustrated in FIG. 1.

In addition, hereinafter, for convenience of description, an upper side in FIGS. 1 to 7, and 9 is "upper" or "upward side", and a lower side is "lower" or "downward side" (the same in FIG. 10 of a second embodiment). In addition, a base (a first base and a second base) side in FIGS. 1 to 7, and 9 is "base end" or "upstream", and a side opposite thereto (hand side) is "tip end" or "downstream" (the same in FIG. 10 of the second embodiment). In addition, an up-and-down direction in FIGS. 1 and 9 is a "vertical direction", and a leftward-and-rightward direction is a "horizontal direction" (the same in FIG. 10 in the second embodiment).

A robot system 100 illustrated in FIG. 1 includes a cell 5, and a robot cell 50 including a first robot 1a and a second robot 1b.

The robot system 100 can be used in a manufacturing process of manufacturing a precision machine, such as a watch. In addition, each of the first robot 1a and the second robot 1b can perform work, such as supplying, removing, transporting, and assembling a precision machine or components that configure a precision machine.

In addition, the robot system 100 includes a robot control device (control portion) which is not illustrated. The robot control device may be provided in the cell 5, or may be embedded in each of the first robot 1a and the second robot 1b. In addition, the first robot 1a and the second robot 1b may be separated from each other. In addition, the robot control device can be configured of a personal computer (PC) or the like in which a central processing unit (CPU) is embedded.

Cell

As illustrated in FIG. 1, the cell 5 is a frame body which surrounds the first robot 1a and the second robot 1b, and easily performs relocation. In the cell 5, in general, each of the first robot 1a and the second robot 1b performs the work of assembling.

The cell 5 includes four leg portions 54 which install the entire cell 5 in an installation space, such as a ground surface (floor), a frame body portion 51 which is supported by the leg portions 54, a floor portion 52 provided below the frame body portion 51, and a ceiling portion 53 which is provided at an upper part of the inside of the frame body portion 51.

The frame body portion 51 includes four columns (support columns) 511 which extend in the vertical direction, a frame-shaped lower portion 512 which is provided at the lower ends of the four columns 511, and a frame-shaped upper portion 513 which is provided at the upper ends of the four columns 511. In addition, between the adjacent columns 511 (side surface portion of the frame body portion 51), and in the upper portion 513, a safety plate (not illustrated) may be installed to prevent an operator or foreign substances, such as dust, from infiltrating into the frame body portion 51.

Above the lower portion 512, the floor portion 52 is provided. The floor portion 52 is a member which supports the first robot 1a, and has a shape of a rectangular plate (frame) in the embodiment. Four corners of the floor portion 52 are supported by the four columns 511 of the frame body portion 51. An upper surface of the floor portion 52 is a floor surface (first surface) 521, and a base 11 of the first robot 1a which will be described later is supported by the floor surface 521.

In addition, below the upper portion 513, the ceiling portion 53 is provided. The ceiling portion 53 is a member which supports the second robot 1b, and has a shape of a rectangular plate (frame) in the embodiment. Four corners of the ceiling portion 53 are supported by the four columns 511 of the frame body portion 51. A lower surface of the ceiling portion 53 is a ceiling surface (second surface) 531, and the base 11 of the second robot 1b which will be described later is supported by the ceiling surface 531.

In addition, in a center portion in the frame body portion 51, component supply portions 71 and 72 in which the first robot 1a or the second robot 1b supplies the components, and a component removing portion 73 in which the first robot 1a or the second robot 1b removes the components, are provided in the cell 5. The component supply portions 71 and 72, and the component removing portion 73 are provided at positions where the first robot 1a and the second robot 1b perform the work of supplying and removing the components.

In addition, in the description above, the first robot 1a is attached to the floor portion 52, but the first robot 1a may be attached to the lower portion 512, for example. In this case, the lower surface or the upper surface of the lower portion 512 may be considered as the floor surface (first surface). In addition, the second robot 1b is attached to the ceiling portion 53, but the second robot 1b may be attached to the upper portion 513. In this case, the lower surface or the upper surface of the upper portion 513 may be considered as the ceiling surface (second surface). In addition, the cell 5 may not have the leg portion 54. In this case, the lower portion 512 may be directly installed to the installation space.

First Robot and Second Robot

As illustrated in FIG. 2, each of the first robot 1a and the second robot 1b includes the base (a first base and a second base) 11, and a robot arm 10. The robot arm 10 includes a first arm (an n-th arm, an m-th arm) 12, a second arm (an (n+1)th arm, an (m+1)th arm) 13, a third arm 14, a fourth arm 15, a fifth arm 16, and a sixth arm 17 (six arms); and a first driving source 401, a second driving source 402, a third driving source 403, a fourth driving source 404, a fifth driving source 405, and a sixth driving source 406 (six driving sources). In addition, an end effecter including a hand 91 which grabs a precision machine, such as a watch, and components, is configured to be attachable to and detachable from the tip end of the sixth arm 17.

Each of the first robot 1a and the second robot 1b is a vertical articulated (6 axes) robot in which the base 11, the first arm 12, the second arm 13, the third arm 14, the fourth arm 15, the fifth arm 16, and the sixth arm 17 are linked to each other from a base end side to a tip end side in this order. In addition, hereinafter, each of the first arm 12, the second arm 13, the third arm 14, the fourth arm 15, the fifth arm 16, and the sixth arm 17 is also called an "arm". In addition, each of the first driving source 401, the second driving source 402, the third driving source 403, the fourth driving source 404, the fifth driving source 405, and the sixth driving source 406 is also called a "driving source (driving portion)".

As illustrated in FIG. 2, the base 11 is a part (attached member) fixed to the floor surface 521 or the ceiling surface 531. A fixing method is not particularly limited, and for example, a fixing method or the like using a plurality of bolts can be employed.

In addition, in the embodiment, the plate-shaped flange 111 provided below the base 11 is attached to the floor surface 521 or the ceiling surface 531, but an attachment location to the floor surface 521 or the ceiling surface 531 of the base 11 is not limited thereto, and for example, may be on the upper surface of the base 11.

In addition, in the base 11, a joint 171 which will be described later may be included, and may not be included (refer to FIG. 3).

As illustrated in FIG. 2, the robot arm 10 is supported to be rotatable with respect to the base 11, and each of the arms 12 to 17 is supported to be displaceable being separated with respect to base 11.

The first arm 12 is formed to be bent. The first arm 12 includes a first part 121 which is connected to the base 11 and extends downwardly in the vertical direction from the base 11, a second part 122 which extends in the horizontal direction from a lower end of the first part 121, a third part 123 which is provided in an end portion opposite to the first part 121 of the second part 122, and extends in the vertical direction, and a fourth part 124 which extends in the horizontal direction from a tip end of the third part 123. In addition, the first part 121, the second part 122, the third part 123, and the fourth part 124 are formed to be integrated. In addition, when viewed from a near side of a paper surface of FIG. 2 (when viewed from a front surface which is orthogonal to both a first rotating axis O1 and a second rotating axis O2 which will be described later), the second part 122 and the third part 123 are substantially orthogonal (intersect) to each other.

The second arm 13 has a longitudinal shape, and is connected to the tip end portion (an end portion opposite to the third part 123 of the fourth part 124) of the first arm 12.

The third arm 14 has a longitudinal shape, and is connected to an end portion opposite to the end portion to which the first arm 12 is connected in the second arm 13.

The fourth arm 15 is connected to an end portion opposite to the end portion to which the second arm 13 is connected in the third arm 14. The fourth arm 15 includes one pair of supporting portions 151 and 152 which oppose each other. The supporting portions 151 and 152 are used in connection with the fifth arm 16.

The fifth arm 16 is positioned between the supporting portions 151 and 152, and is linked to the fourth arm 15 as being connected to the supporting portions 151 and 152.

The sixth arm 17 has a shape of a flat plate, and is connected to a tip end portion of the fifth arm 16. In addition, in a tip end portion (an end portion opposite to the fifth arm 16) of the sixth arm 17, the hand 91 is mounted to be attachable and detachable. The hand 91 is not particularly limited, and an example thereof includes a configuration in which a plurality of finger portions (fingers) are provided.

In addition, each exterior of each of the above-described arms 12 to 17 may be configured of one member, or may be configured of a plurality of members.

Next, with reference to FIGS. 2 and 3, the driving sources 401 to 406 will be described together with the driving of the arms 12 to 17. In addition, FIG. 3 illustrates a schematic view of the first robot 1a (second robot 1b), and illustrates a state viewed from a right side of FIG. 2. In addition, in FIG. 3, a state where the arms 13 to 17 are rotated from the state illustrated in FIG. 2 is illustrated.

As illustrated in FIG. 3, the base 11 and the first arm 12 are linked to each other via the joint 171. The joint 171 includes a mechanism which supports the first arm 12 linked to the base 11 to be rotatable with respect to the base 11. Accordingly, the first arm 12 can rotate around the first rotating axis (an n-th rotating axis, an m-th rotating axis) O1 (around the first rotating axis O1) parallel to the vertical direction, with respect to the base 11. The first rotating axis O1 matches a normal line of the floor surface 521 to which the base 11 is attached, or a normal line of the ceiling surface 531. In addition, the first rotating axis O1 of the first robot 1a is a rotating axis which is furthest on the upstream side of the first robot 1a. In addition, the rotating axis is also similar in the second robot 1b. The rotation around the first rotating axis O1 is performed by driving the first driving source 401 which includes a motor 401M. In addition, the first driving source 401 is driven by the motor 401M and a cable (not illustrated), and the motor 401M is controlled by a robot control device via an electrically connected motor driver 301 (refer to FIG. 2). In addition, the first driving source 401 may be configured to transfer a driving force from the motor 401M by a speed reducer (not illustrated) provided together with the motor 401M, or the speed reducer may be omitted.

In addition, the first arm 12 and the second arm 13 are linked to each other via a joint 172. The joint 172 includes a mechanism which supports one of the first arm 12 and the second arm 13 that are linked to each other to be rotatable with respect to the other. Accordingly, the second arm 13 can rotate around the second rotating axis (an (n+1)th rotating axis, an (m+1)th rotating axis) O2 (around the second rotating axis O2) parallel to the horizontal direction, with respect to the first arm 12. The second rotating axis O2 is orthogonal to the first rotating axis O1. The rotation around the second rotating axis O2 is performed by driving the second driving source 402 which includes a motor 402M. In addition, the second driving source 402 is driven by the motor 402M and a cable (not illustrated), and the motor 402M is controlled by a robot control device via an electrically connected motor driver 302. In addition, the second driving source 402 may be configured to transfer a driving force from the motor 402M by a speed reducer (not illustrated) provided together with the motor 402M, or the speed reducer may be omitted. In addition, the second rotating axis O2 may be parallel to an axis which is orthogonal to the first rotating axis O1, and the second rotating axis O2 may not be orthogonal to the first rotating axis O1, or the axial directions may be different from each other.

In addition, the second arm 13 and the third arm 14 are linked to each other via a joint 173. The joint 173 includes a mechanism which supports one of the second arm 13 and the third arm 14 that are linked to each other to be rotatable with respect to the other. Accordingly, the third arm 14 can rotate around a third rotating axis O3 (around the third rotating axis O3) parallel to the horizontal direction, with respect to the second arm 13. The third rotating axis O3 is parallel to the second rotating axis O2. The rotation around the third rotating axis O3 is performed by driving the third driving source 403. In addition, the third driving source 403 is driven by a motor 403M and a cable (not illustrated), and the motor 403M is controlled by a robot control device via an electrically connected motor driver 303. In addition, the third driving source 403 may be configured to transfer a driving force from the motor 403M by a speed reducer (not illustrated) provided together with the motor 403M, or the speed reducer may be omitted.

In addition, the third arm 14 and the fourth arm 15 are linked to each other by a joint 174. The joint 174 includes a mechanism which supports one of the third arm 14 and the fourth arm 15 that are linked to each other to be rotatable with respect to the other. Accordingly, the fourth arm 15 can rotate around a fourth rotating axis O4 (around the fourth rotating axis O4) parallel to a central axial direction of the third arm 14, with respect to the third arm 14. The fourth rotating axis O4 is orthogonal to the third rotating axis O3. The rotation around the fourth rotating axis O4 is performed by driving the fourth driving source 404. In addition, the fourth driving source 404 is driven by a motor 404M and a cable (not illustrated), and the motor 404M is controlled by a robot control device via an electrically connected motor driver 304. In addition, the fourth driving source 404 may be configured to transfer a driving force from the motor 404M by a speed reducer (not illustrated) provided together with the motor 404M, or the speed reducer may be omitted. In addition, the fourth rotating axis O4 may be parallel to the axis which is orthogonal to the third rotating axis O3, and the fourth rotating axis O4 may not be orthogonal to the third rotating axis O3, or the axial directions may be different from each other.

In addition, the fourth arm 15 and the fifth arm 16 are linked to each other by a joint 175. The joint 175 includes a mechanism which supports one of the fourth arm 15 and the fifth arm 16 that are linked to each other to be rotatable with respect to the other. Accordingly, the fifth arm 16 can rotate around a fifth rotating axis O5 (around the fifth rotating axis O5) orthogonal to a central axial direction of the fourth arm 15, with respect to the fourth arm 15. The fifth rotating axis O5 is orthogonal to the fourth rotating axis O4. The rotation around the fifth rotating axis O5 is performed by driving the fifth driving source 405. In addition, the fifth driving source 405 is driven by a motor 405M and a cable (not illustrated), and the motor 405M is controlled by a robot control device via an electrically connected motor driver 305. In addition, the fifth driving source 405 may be configured to transfer a driving force from the motor 405M by a speed reducer (not illustrated) provided together with the motor 405M, or the speed reducer may be omitted. In addition, the fifth rotating axis O5 may be parallel to the axis which is orthogonal to the fourth rotating axis O4, and the fifth rotating axis O5 may not be orthogonal to the fourth rotating axis O4, or the axial directions may be different from each other.

In addition, the fifth arm 16 and the sixth arm 17 are linked to each other by a joint 176. The joint 176 includes a mechanism which supports one of the fifth arm 16 and sixth arm 17 that are linked to each other to be rotatable with respect to the other. Accordingly, the sixth arm 17 can rotate around a sixth rotating axis O6 (around the sixth rotating axis O6), with respect to the fifth arm 16. The sixth rotating axis O6 is orthogonal to the fifth rotating axis O5. The rotation around the sixth rotating axis O6 is performed by driving the sixth driving source 406. In addition, the sixth driving source 406 is driven by a motor 406M and a cable (not illustrated), and the motor 406M is controlled by a robot control device via an electrically connected motor driver 306. In addition, the sixth driving source 406 may be configured to transfer a driving force from the motor 406M by a speed reducer (not illustrated) provided together with the motor 406M, or the speed reducer may be omitted. In addition, the sixth rotating axis O6 may be parallel to the axis which is orthogonal to the fifth rotating axis O5, and the sixth rotating axis O6 may not be orthogonal to the fifth rotating axis O5, or the axial directions may be different from each other.

In addition, each of the first robot 1a and the second robot 1b which are driven in this manner controls the operation of the arms 12 to 17 while grabbing the precision machine or the components by the hand 91 connected to the tip end portion of the sixth arm 17. Accordingly, it is possible to perform each kind of work, such as transporting the precision machine or the components. In addition, the driving of the hand 91 is controlled by the robot control device.

Above, the configuration of the first robot 1a and the second robot 1b is simply described.

Next, with reference to FIGS. 4, 5, and 6A to 6E, a relationship between the arms 12 to 17 will be described, but will be described from various points of view changing the expressions or the like. In addition, regarding the third arm 14, the fourth arm 15, the fifth arm 16, and the sixth arm 17, a state where the arms are straightly extended, that is, as illustrated in FIGS. 4 and 5, a state where the fourth rotating axis O4 and the sixth rotating axis O6 match each other or are parallel to each other, is considered.

First, as illustrated in FIG. 4, the length L1 of the first arm 12 is set to be longer than the length L2 of the second arm 13.

Here, the length L1 of the first arm 12 is a distance between the second rotating axis O2 and a center line 611 which extends in a leftward-and-rightward direction in FIG. 4 of a bearing portion 61 (a member included in the joint 171) which supports the first arm 12 to be rotatable, when viewed from the axial direction of the second rotating axis O2. In addition, the length L2 of the second arm 13 is a distance between the second rotating axis O2 and the third rotating axis O3, when viewed from the axial direction of the second rotating axis O2.

In addition, as illustrated in FIG. 5, each of the first robot 1a and the second robot 1b is configured to make it possible to make an angle θ made by the first arm 12 and the second arm 13 0°, when viewed from the axial direction of the second rotating axis O2. In other words, each of the first robot 1a and the second robot 1b is configured to make it possible to make the first arm 12 and the second arm 13 overlap each other, when viewed from the axial direction of the second rotating axis O2. In addition, when the angle θ is 0°, that is, when the first arm 12 and the second arm 13 overlap each other when viewed from the axial direction of the second rotating axis O2, the second arm 13 is configured not to interfere with the second part 122 of the first arm 12.

Here, the angle θ made by the first arm 12 and the second arm 13 is an angle made by a straight line (a center axis of the second arm 13 when viewed from the axial direction of the second rotating axis O2) 621 which passes through the second rotating axis O2 and the third rotating axis O3, and the first rotating axis O1, when viewed from the axial direction of the second rotating axis O2 (refer to FIG. 4).

In addition, as illustrated in FIG. 5, each of the first robot 1a and the second robot 1b is configured so that the second arm 13 and the third arm 14 overlap each other when viewed from the axial direction of the second rotating axis O2. In other words, each of the first robot 1a and the second robot 1b is configured so that the first arm 12, the second arm 13, and the third arm 14 overlap each other at the same time when viewed from the axial direction of the second rotating axis O2.

In addition, a length L3 which is the total length of the third arm 14, the fourth arm 15, the fifth arm 16, and the sixth arm 17 is set to be longer than the length L2 of the second arm 13. Accordingly, when viewed from the axial direction of the second rotating axis O2, in a case where the second arm 13 and the third arm 14 overlap each other, it is possible to make the tip end of the robot arm 10 protrude, that is, the tip end of the sixth arm 17, protrude from the second arm 13. According to this, it is possible to prevent the hand 91 from being interfered by the first arm 12 and the second arm 13.

Here, the length L3 which is the total length of the third arm 14, the fourth arm 15, the fifth arm 16, and the sixth arm 17 is a distance between the tip ends of the third rotating axis O3 and the sixth arm 17, when viewed from the axial direction of the second rotating axis O2 (refer to FIG. 5). In this case, the third arm 14, the fourth arm 15, the fifth arm 16, and the sixth arm 17 are in a state where the fourth rotating axis O4 and the sixth rotating axis O6 match each other as illustrated in FIG. 5, or in a state where the fourth rotating axis O4 and the sixth rotating axis O6 are parallel to each other.

Figure 6A:
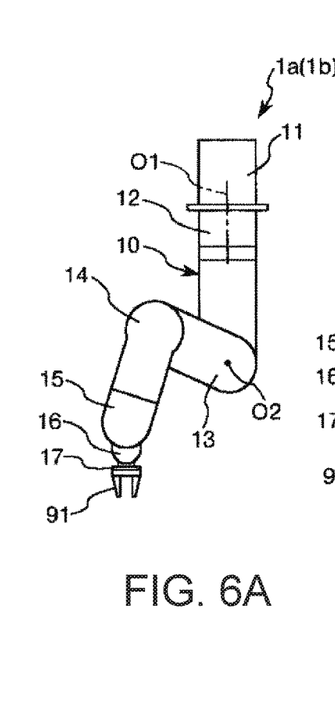
Figure 6B:
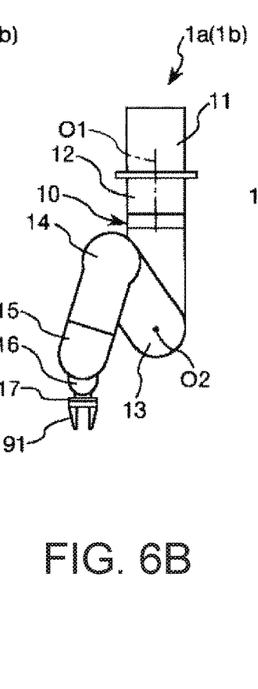
Figure 6C:
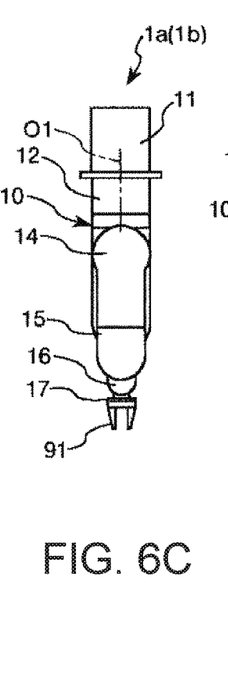
Figure 6D:
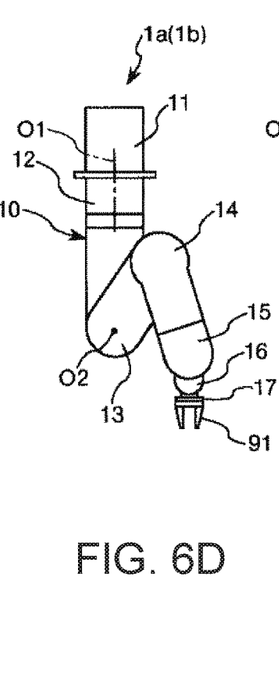
Figure 6E:
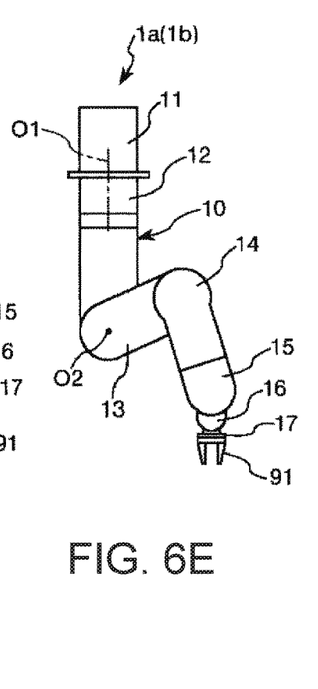

As illustrated in FIGS. 6A, 6B, 6C, 6D, and 6E, each of the first robot 1a and the second robot 1b does not rotate the first arm 12, and rotate the second arm 13. Accordingly, it is possible to move the tip end of the second arm 13 to a position different by 180° around the first rotating axis O1 via a state where the angle θ becomes 0° when viewed from the axial direction of the second rotating axis O2. For this reason, it is possible to move the tip end of the robot arm 10 to a position (second position) illustrated in FIG. 6E different by 180° around the first rotating axis O1 from the position illustrated in FIG. 6A, from a position (first position) illustrating the tip end (tip end of the sixth arm 17) of the robot arm 10 as illustrated in FIG. 6A, via a state where the first arm 12 and the second arm 13 overlap each other as illustrated in FIG. 6C. Accordingly, when viewed from the axial direction of the first rotating axis O1, it is possible to move the hand 91 (tip end of the robot arm 10) on a straight line. In addition, during the movement, each of the third arm 14, the fourth arm 15, the fifth arm 16, and the sixth arm 17 is rotated as necessary.

Next, with reference to FIGS. 7A to 7C, and 8, work performed by the first robot 1a and the second robot 1b, and one example of an operation of the first robot 1a and the second robot 1b during the work, will be described. Here, an operation of the first robot 1a and the second robot 1b when performing work of assembling a component 42 taken out of the component supply portion 72 to a panel 41 taken out of the component supply portion 71 by the first robot 1a and the second robot 1b will be described. In addition, as illustrated in FIGS. 7A to 7C, in the work, the first robot 1a is in a state where the first arm 12 is rotated by 90° around the first rotating axis O1 from the state illustrated in FIG. 1.

First, as illustrated in FIG. 7A, the first robot 1a grabs the panel 41 disposed in the component supply portion 71 by the hand 91, and takes out the panel 41. In detaching the panel 41, the first robot 1a does not rotate the first arm 12, and rotates the second arm 13 and the third arm 14. Accordingly, the first robot 1a can move the panel 41 in the horizontal direction while maintaining the height (position in the vertical direction) of the panel 41 (tip end of the robot arm 10) to be substantially constant. In addition, at this time, as necessary, fine adjustment may be performed by rotating an arbitrary arm among the first arm 12, the fifth arm 16, and the sixth arm 17.

In addition, as illustrated in FIG. 7A, the second robot 1b grabs the component 42 disposed in the component supply portion 72 by the hand 91, and takes out the component 42. At this time, by performing an operation similar to the operation of the above-described first robot 1a, the second robot 1b can also move the component 42 in the horizontal direction.

Next, as illustrated in FIG. 7B, the first robot 1a moves the hand 91, and transports the grabbed panel 41 between the component supply portion 71 and the component removing portion 73. At this time, the first robot 1a does not rotate the first arm 12, and rotates the second arm 13 and the third arm 14, and accordingly, the first arm 12 and the second arm 13 are in an overlapped state. Even during the transporting, as the first robot 1a does not rotate the first arm 12 and rotates the second arm 13 and the third arm 14, it is possible to move the panel 41 in the horizontal direction while maintaining the height of the panel 41 to be substantially constant. In addition, fine adjustment may be performed by rotating the first arm 12, the fifth arm 16, and the sixth arm 17.

In addition, as illustrated in FIG. 7B, the second robot 1b also moves the hand 91, and transports the grabbed component 42 between the component supply portion 71 and the component removing portion 73 in the cell 5. At this time, by performing an operation similar to the operation of the above-described first robot 1a, the second robot 1b can also move the component 42 in the horizontal direction. After this, the second robot 1b assembles the component 42 to the panel 41 grabbed by the first robot 1a.

Next, as illustrated in FIG. 7C, the first robot 1a moves the hand 91 to the component removing portion 73 which is at a position different by 180° around the first rotating axis O1 from the component supply portion 71, and disposes the panel 41 to which the component 42 is assembled to the component removing portion 73. At this time, the first robot 1a also does not rotate the first arm 12, and rotates the second arm 13 and the third arm 14, and accordingly, it is possible to move the panel 41 in the horizontal direction. In addition, at this time, as necessary, fine adjustment may also be performed by rotating an arbitrary arm among the first arm 12, the fifth arm 16, and the sixth arm 17.

In this manner, it is possible to perform the work of assembling the component 42 to the panel 41 by the first robot 1a and the second robot 1b.

As illustrated in FIG. 8, by driving the robot arm 10 as described above, the first robot 1a can perform the operation of moving the hand 91 as illustrated by an arrow 56, without performing an operation of moving the hand 91 as illustrated by arrows 57 and 58. In other words, the first robot 1a can perform an operation of moving the hand 91 (tip end of the robot arm 10) on a straight line when viewed from the axial direction of the first rotating axis O1. In addition, the second robot 1b can also perform a similar operation. Accordingly, since it is possible to reduce the size of a space for preventing interference of the first robot 1a and second robot 1b, it is possible to reduce the size of the cell 5. For this reason, it is possible to reduce an area (installation area) of the installation space for installing the robot cell 50, that is, an area S when viewed from the vertical direction of the cell 5, to be smaller than that in the related art. Therefore, a width W of the cell 5 can be smaller than a width WX in the related art, specifically, for example, can be equal to or less than 80% of the width WX in the related art.

In addition, in the embodiment, the cell 5 is a square when viewed from the vertical direction. For this reason, in the embodiment, the width (depth) W of the cell 5 in the up-and-down direction in FIG. 8, and the width (lateral width) W of the cell 5 in the left-and-right direction in FIG. 8 are the same, but the widths may be different from each other. In this case, any of the widths W can be equal to or less than 80% of the width WX in the related art.

Specifically, it is preferable that the area S is less than 637,500 mm$^2$, it is more preferable that the area S is equal to or less than 500,000 mm$^2$, it is still more preferable that the area S is equal to or less than 400,000 mm$^2$, and it is particularly preferable that the area S is equal to or less than 360,000 mm$^2$. Even in the area S, it is possible to reduce the space for preventing interference of the first robot 1a and the second robot 1b when the tip end of the second arm 13 is moved to a position different by 180° around the second rotating axis. For this reason, it is possible to reduce the size of the cell 5, and accordingly, to further reduce the installation space for installing the robot cell 50. Accordingly, for example, when a manufacturing line is configured by aligning a plurality of robot cells 50, it is possible to suppress the length of the production line not to be longer.

In addition, the area S which is equal to or less than 400,000 mm$^2$ is substantially equivalent to, or equal to or less than the size of a work region where a human being works. For this reason, when the area S is equal to or less than 400,000 mm$^2$, for example, it is possible to easily perform exchange between the human being and the robot cell 50. For this reason, when the manufacturing line is changed by exchanging the human being and the robot cell 50, it is possible to easily perform the exchange. In addition, it is preferable that the area S is equal to or greater than 10,000 mm$^2$. Accordingly, it is possible to easily perform maintenance of the inside of the robot cell 50.

In addition, specifically, it is preferable that the width W is less than 850 mm, it is more preferable that the width W is less than 750 mm, and it is still more preferable that the width W is equal to or less than 650 mm (refer to FIG. 9). Accordingly, it is possible to sufficiently show effects similar to the above-described effects. In addition, the width W is an average width (average width of the frame body portion 51) of the cell 5. In addition, it is preferable that the width W is equal to or greater than 100 mm. Accordingly, it is possible to easily perform maintenance of the inside of the robot cell 50.

In addition, as described above, each of the first robot 1a and the second robot 1b can move the hand 91 without substantially changing the height of the tip end of the robot arm 10 (maintaining the height to be substantially constant). For this reason, it is possible to further reduce the height (length in the vertical direction) L of the cell 5 to be lower than the height in the related art (refer to FIG. 9). Specifically, it is possible to make the height L of the cell 5 to be equal to or less than 80% of the height in the related art. Accordingly, it is possible to lower the ceiling surface 531, and thus, it is possible to lower the position of the center of gravity of the second robot 1b positioned above. For this reason, it is possible to reduce oscillation generated by an operation of the second robot 1b.

Specifically, it is preferable that the height L is equal to or less than 1,700 mm, and it is more preferable that the height L is 1,000 mm to 1,650 mm. When the height L is equal to or less than the upper limit value, it is possible to further suppress an influence of oscillation when the second robot 1b is operated in the cell 5. In addition, when the height L is equal to or greater than the lower limit value, it is possible to avoid interference between the first robot 1a and the second robot 1b. In addition, the above-described height L is an average height of the cell 5 (including the leg portion 54).

In addition, in the robot system 100 of the embodiment, two robots (the first robot 1a and the second robot 1b) are disposed in one cell 5. For this reason, it is possible to perform more work in one cell 5.

For example, in the description above, the work of assembling the component 42 to the plate surface of the panel 41 is performed by the first robot 1a and the second robot 1b, but according to the first robot 1a and the second robot 1b, for example, it is possible to perform the work of assembling the component 42 to a side surface of the panel 41. In this case, for example, when transporting the panel 41 grabbed by the first robot 1a between component supply portion 71 and the component removing portion 73, as the first robot 1a rotates the fifth arm 16 and the sixth arm 17, the plate surface of the panel 41 is along the vertical direction. Accordingly, since it is possible to make the side surface of the panel 41 be oriented to the second robot 1b side, it is possible to assemble the component 42 to the side surface of the panel 41 by the second robot 1b.

In addition, as the first robot 1a and the second robot 1b are provided in one cell 5, it is possible to install the robot cell 50 in much smaller installation space, compared to a robot system having two robot cells in which one robot is disposed in one cell.

In addition, in the embodiment, the first robot 1a is attached to the floor surface 521, and the second robot 1b is attached to the ceiling surface 531 which opposes the floor surface 521. Accordingly, it is possible to dispose the first robot 1a and the second robot 1b to oppose each other, and to overlap the first robot 1a and the second robot 1b each other when viewed from the vertical direction. For this reason, compared to a robot system having a robot cell in which the first robot 1a and the second robot 1b are aligned in the horizontal direction in one cell, it is possible to install the robot cell 50 in a much smaller installation space.

In particular, in the embodiment, the first robot 1a and the second robot 1b are disposed so that the base 11 of the first robot 1a and the base 11 of the second robot 1b overlap each other when viewed from the vertical direction. For this reason, it is possible to overlap the first robot 1a and the second robot 1b each other when viewed from the vertical direction, and to install the robot cell 50 in a much smaller installation space.

In addition, in the embodiment, the base 11 of the first robot 1a and the base 11 of the second robot 1b overlap each other when viewed from the vertical direction, but if at least a part of the base 11 of the first robot 1a and at least apart of the base 11 of the second robot 1b overlap each other, it is possible to show the effects which are substantially similar to those described above. In addition, in the embodiment, the floor surface 521 and the ceiling surface 531 overlap each other when viewed from the vertical direction, but if at least a part of the surface to which the base 11 of the first robot 1a is attached overlaps at least a part of the surface to which the base 11 of the second robot 1b is attached, it is easy to dispose the first robot 1a and the second robot 1b to overlap each other when viewed from the vertical direction. For this reason, it is possible to show the effects equivalent to those described above.

In this manner, since it is possible to install the robot cell 50 in a smaller installation space than in the related art, for example, when the manufacturing line is configured by aligning the plurality of robot cells 50, it is possible to dispose more robot cells 50 per unit length. For this reason, it is possible to shorten the manufacturing line.

Second Embodiment

Figure 10:
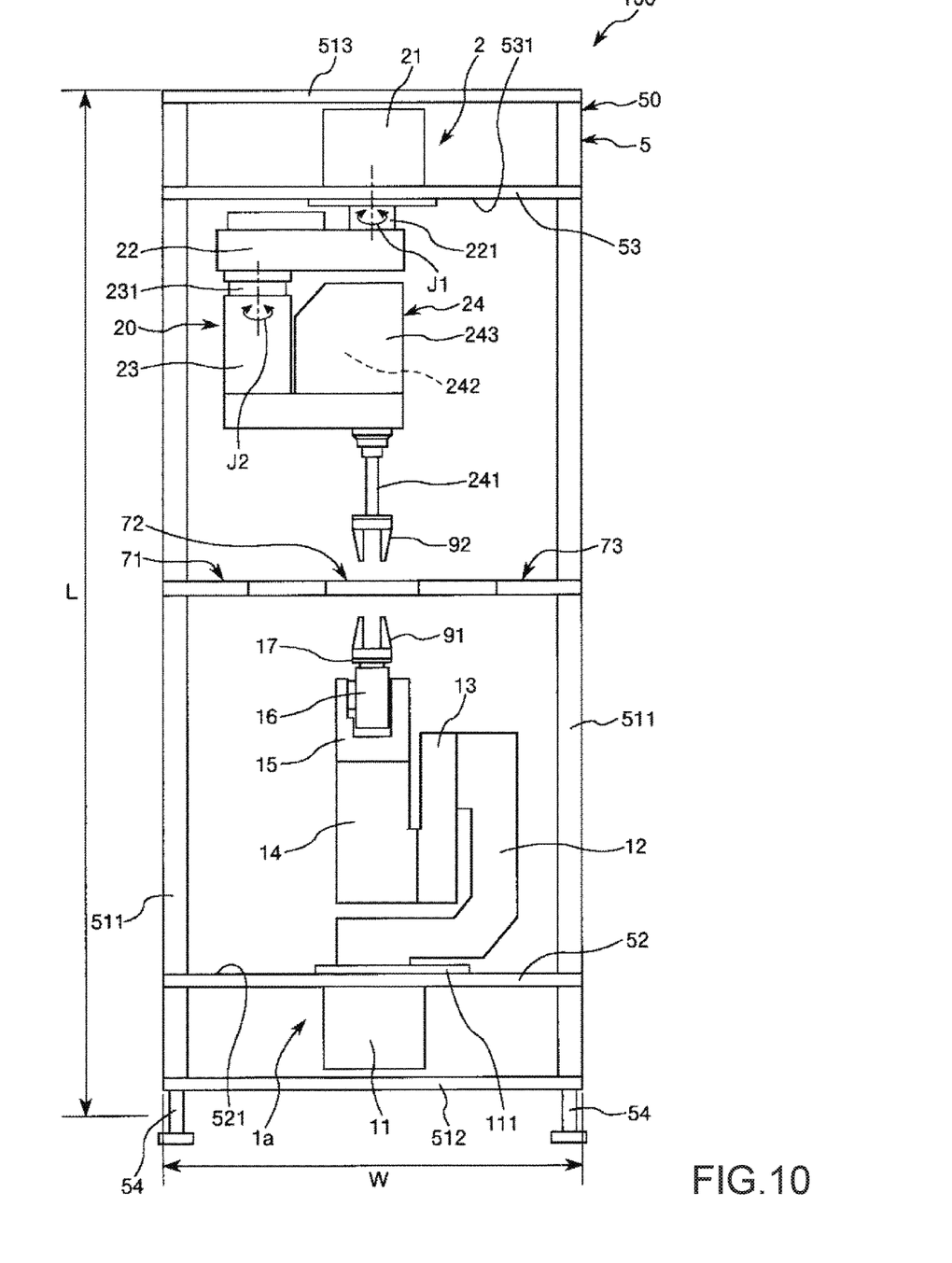
FIG. 10 is a front view illustrating a second embodiment of the robot system according to the invention.

FIG. 10 is a front view illustrating a second embodiment of the robot system according to the invention.

Hereinafter, the second embodiment will be described with reference to the drawings, but the description will only focus on differences from the above-described embodiment, and similar contents will be omitted from the description.

The robot system of the embodiment is similar to that of the above-described embodiment except the configuration of the second robot.

A second robot 2 included in the robot system 100 illustrated in FIG. 10 includes a base (second base) 21, a robot arm 20 which is connected to the base 21, and a work head 24 which is connected to the robot arm 20.

The robot arm 20 includes a first arm (m-th arm) 22 which extends in the horizontal direction, and a second arm ((m+1)th arm) 23 which makes a shape of L in a front view. The first arm 22 is connected to the base 21 by a first joint portion 221, and can rotate with respect to the base 21 around a rotating axis J1 which is substantially parallel to the vertical direction. A second arm 23 is connected to the first arm 22 by a second joint portion 231, and can rotate with respect to the first arm 22 around a rotating axis J2 which is substantially parallel to the rotating axis J1. In addition, the above-described "parallel" includes a state where the rotating axis J2 is inclined by approximately 0° to ±5° with respect to the rotating axis J1, in addition to a state of being completely parallel.

In addition, the first arm 22 and the second arm 23 are driven by a motor unit which is not illustrated. In the robot arm 20 having such a configuration, the rotating axis J1 of the first arm 22 and the rotating axis J2 of the second arm 23 are shifted from each other in the horizontal direction. For this reason, it is possible to widen a movable range of the robot arm 20.

The work head 24 includes a column-like operation shaft 241 provided at a tip end of the second arm 23, a driving source (driving portion) 242, a head cover (cover member) 243 provided in the second arm 23 to cover the operation shaft 241 and the driving source 242 from above. The operation shaft 241 is provided along the vertical direction, and the tip end portion (lower end portion) thereof protrudes from the second arm 23. As illustrated in FIG. 10, an end effector, such as a hand 92, is attached to the protruding tip end portion to be freely attached and detached. In addition, the operation shaft 241 can be raised and lowered along the vertical direction, and rotate around the axis of the operation shaft 241, by the driving source 242.

According to the second robot 2, the first arm 22 and the second arm 23 are rotated in the horizontal direction, and the operation shaft 241 is raised and lowered, or rotated. Accordingly, it is possible to perform work of supplying, removing, transporting, and assembling the components. In addition, since the second robot 2 having the configuration is small, it is possible to reduce the size of the space for preventing interfere of the second robot 2, and thus, to further reduce the size of the installation space in which the robot cell 50 (robot system 100) is installed.

According to the second embodiment, it is also possible to achieve effects similar to those of the above-described first embodiment.

Above, the robot system according to the invention is described based on the embodiments illustrated in the drawings, but the invention is not limited thereto, and configurations of each portion can be switched to an arbitrary configuration having similar effects. In addition, another arbitrary configuration element may be added. In addition, the invention may be a combination of two or more arbitrary configurations (characteristics) among each of the above-described embodiments.

In addition, in the embodiments, the number of rotating axes of the robot arm included in the first robot is six, but in the invention, the number is not limited thereto, and the number of the rotating axes of the robot arm may be two, three, four, five, seven or more. In addition, the number of rotating axes of the robot arm included in the second robot may also be several. In addition, in the embodiment, the number of arms included in the first robot is six, but in the invention, the number is not limited thereto, and the number of arms included in the first robot may be two, three, four, five, seven or more. In addition, the number of arms included in the second robot may also be several.

In addition, in the embodiments, the number of robot arms included in the first robot is one, but in the invention, the number is not limited thereto, and the number of robot arms included in the first robot may be two or more. In other words, the first robot may be a robot having a plurality of arms, such as a robot having two arms. In addition, the second robot is also similar.

In addition, in the embodiments, an aspect in which two robots are present in one cell is described, but the number of robots disposed in one cell is not limited thereto, and may be three or more. In addition, in the above-described embodiments, an aspect in which one first robot and one second robot are present in one cell is described, but the number of first robots and second robots which are disposed in one cell is not limited thereto. For example, two or more first robots may be disposed in one cell, and two or more second robots may also be disposed in one cell.

In addition, in the embodiments, the work of assembling the component grabbed by the second robot to the component (panel) grabbed by the first robot is described as an example, but the work performed by the first robot and the second robot is not limited thereto. For example, with respect to one component supported at any of locations in the cell, work of assembling components grabbed by each of the first robot and the second robot to the supported component may be performed.

In addition, in the embodiments, as an example of the first surface which is the location where the base of the first robot is fixed, the floor surface is described, and as an example of the second surface which is the location where the base of the second robot is fixed, the ceiling surface is described. However, the first surface and the second surface are not limited thereto. Each of the first surface and the second surface may be a lower surface of the floor portion, an upper surface of the ceiling portion, a lower surface or an upper surface of the upper portion of the frame body, a lower surface or an upper surface of the lower portion of the frame body, or a column portion. In addition, the first surface may be the ceiling surface, and the second surface may be the floor surface.

In addition, in the embodiments, the robot supported by the floor surface is described as the first robot, and the robot supported by the ceiling surface is described as the second robot. However, the robot supported by the floor surface may be the second robot, and the robot supported by the ceiling surface may be the first robot.

In addition, in the embodiments, with respect to the condition (relationship) of the n-th rotating axis, the n-th arm, the (n+1)th rotating axis, and the (n+1)th arm which are regulated within the range of the appended claims, a case where the condition is satisfied when n is 1, that is, in case of a first rotating axis, a first arm, a second rotating axis, and a second arm, is described. However, the invention is not limited thereto, and n may be an integer which is equal to or greater than 1, and in a case where n is an arbitrary integer which is equal to or greater than 1, the condition which is similar to the case where n is 1 may be satisfied. Therefore, for example, when n is 2, that is, in case of a second rotating axis, a second arm, a third rotating axis, and a third arm, the condition which is similar to the case where n is 1 may be satisfied. When n is 3, that is, in case of a third rotating axis, a third arm, a fourth rotating axis, and a fourth arm, the condition which is similar to the case where n is 1 may be satisfied. When n is 4, that is, incase of a fourth rotating axis, a fourth arm, a fifth rotating axis, and a fifth arm, the condition which is similar to the case where n is 1 may be satisfied. In addition, when n is 5, that is, in case of a fifth rotating axis, a fifth arm, a sixth rotating axis, and a sixth arm, the condition which is similar to the case where n is 1 may be satisfied.

In addition, the condition (relationship) of the m-th rotating axis, the m-th arm, the (m+1)th rotating axis, and the (m+1)th arm which are regulated within the range of the appended claims are similar to the condition (relationship) of the n-th rotating axis, the n-th arm, the (n+1)th rotating axis, and the (n+1)th arm which are regulated within the range of the appended claims. Therefore, a case where the condition is satisfied when m is 1, that is, in case of a first rotating axis, a first arm, a second rotating axis, and a second arm, is described. However, the invention is not limited thereto, and m may be an integer which is equal to or greater than 1, and in a case where m is an arbitrary integer which is equal to or greater than 1, the condition which is similar to the case where m is 1 may be satisfied.

The entire disclosure of Japanese Patent Application No. 2015-071200, filed Mar. 31, 2015 is expressly incorporated by reference herein.

What is claimed is:
1. A robot system comprising:
a cell; and
a first robot having a first arm that rotates about a first rotating axis, a second arm rotatably connected to the first arm to rotate about a second rotating axis, and a third arm rotatably connected to the second arm to rotate about a third rotating axis, the second rotating axis having an axial direction different from an axial direction of the first rotating axis, and the third rotating axis having an axial direction different from the axial direction of the first rotating axis; and a second robot, wherein the first robot and the second robot are provided in the cell, the first arm includes a horizontal segment and a vertical segment forming a single monolithic piece, a length of the vertical segment of the first arm is longer than a length of the second arm, and when viewed from an axial direction of the second rotating axis, the third arm and the second arm completely overlap with the vertical segment of the first arm.

2. The robot system according to claim 1, wherein the first robot includes a first base provided in the cell, and wherein the n-th arm is provided on the first base.

3. The robot system according to claim 1, wherein the second robot includes;
- a second base,
- an m-th (m is an integer which is equal to or greater than 1) arm which is provided on the second base and rotates around an m-th rotating axis, and
- an (m+1)th arm which is provided to rotate around an (m+1)th rotating axis which is an axial direction parallel to an axial direction of the m-th rotating axis in the m-th arm.

4. The robot system according to claim 1, wherein the second robot includes:
- an m-th (m is an integer which is equal to or greater than 1) arm which rotates around an m-th rotating axis, and
- an (m+1)th arm which is provided to rotate around an (m+1)th rotating axis which is an axial direction different from an axial direction of the m-th rotating axis in the m-th arm.

5. The robot system according to claim 4, wherein a length of the m-th arm is longer than a length of the (m+1)th arm, and wherein, when viewed from an axial direction of the (m+1)th rotating axis, the m-th arm and the (m+1)th arm overlap each other.

6. The robot system according to claim 4, wherein the second robot includes a second base provided in the cell, and wherein the m-th arm is provided on the second base.

7. The robot system according to claim 1, wherein the cell includes a first surface, and a second surface which opposes the first surface, wherein the first robot is provided on the first surface, and wherein the second robot is provided on the second surface.

8. The robot system according to claim 7, wherein at least a part of the first surface overlaps at least a part of the second surface when viewed from the vertical direction.

9. The robot system according to claim 1, wherein the first robot includes a first base provided in the cell, wherein the n-th arm is provided on the first base, wherein the second robot includes a second base provided in the cell, and an m-th arm provided on the second base, and wherein at least a part of the first base overlaps at least a part of the second base when viewed from the vertical direction.

10. The robot system according to claim 1, wherein an installation area of the cell is less than 637,500 $mm^2$.

11. The robot system according to claim 1, wherein an installation area of the cell is less than 500,000 $mm^2$.

* * * * *